US008862731B2

(12) United States Patent
Leung et al.

(10) Patent No.: US 8,862,731 B2
(45) Date of Patent: Oct. 14, 2014

(54) METHOD AND SYSTEM FOR COORDINATING DATA SHARING IN A NETWORK WITH AT LEAST ONE PHYSICAL DISPLAY DEVICE

(75) Inventors: Andrew Leung, Calgary (CA); Viktor Antonyuk, Calgary (CA)

(73) Assignee: SMART Technologies ULC (CA)

( * ) Notice: Subject to any disclaimer, the term of this patent is extended or adjusted under 35 U.S.C. 154(b) by 503 days.

(21) Appl. No.: 12/110,087

(22) Filed: Apr. 25, 2008

(65) Prior Publication Data

US 2009/0271848 A1   Oct. 29, 2009

(51) Int. Cl.
*G06F 15/173* (2006.01)
*H04L 29/08* (2006.01)
*H04L 29/06* (2006.01)

(52) U.S. Cl.
CPC .............. *H04L 67/36* (2013.01); *H04L 67/146* (2013.01); *H04L 67/14* (2013.01); *H04L 65/4015* (2013.01)
USPC ........................................................ 709/225

(58) Field of Classification Search
CPC ..... G06F 21/305; G06F 21/31; G06F 21/606; G06F 21/84; H04L 12/1818; H04L 12/1822; H04L 63/08; H04L 63/083; H04L 63/0838; H04L 65/403; H04L 67/1095
USPC ........................................................ 709/225
See application file for complete search history.

(56) References Cited

U.S. PATENT DOCUMENTS

| | | | | |
|---|---|---|---|---|
| 5,841,871 A | * | 11/1998 | Pinkas | 713/155 |
| 6,335,739 B1 | * | 1/2002 | Matsukura et al. | 715/755 |
| 6,360,254 B1 | * | 3/2002 | Linden et al. | 709/219 |
| 6,449,651 B1 | * | 9/2002 | Dorfman et al. | 709/229 |
| 6,501,463 B1 | * | 12/2002 | Dahley et al. | 345/173 |
| 6,915,347 B2 | * | 7/2005 | Hanko et al. | 709/227 |
| 7,370,349 B2 | * | 5/2008 | Holvey et al. | 726/5 |
| 2002/0169831 A1 | | 11/2002 | Lee et al. | |

(Continued)

FOREIGN PATENT DOCUMENTS

| | | |
|---|---|---|
| EP | 2 019 542 A1 | 1/2009 |
| JP | 2004-287160 A | 10/2004 |
| WO | 01/89144 A2 | 11/2001 |

OTHER PUBLICATIONS

Zweije, Vincent. "Remote X Apps mini-HOWTO." Dec. 8, 2001. Accessed on Jul. 1, 2010: <http://www.faqs.org/docs/Linux-mini/Remote-X-Apps.html>. pp. 1-15.*

(Continued)

*Primary Examiner* — Christopher Biagini
(74) *Attorney, Agent, or Firm* — Katten Muchin Rosenman LLP

(57) ABSTRACT

An apparatus for coordinating data sharing in a computer network with at least one physical display device is provided. The apparatus includes a code generator generating at least one unique temporary session connection code (SCC), and a storage device storing associations between each of the at least one SCC and one or more of the at least one physical display device. An interface receives requests from one or more source computers to establish communications sessions for sharing data, and a processor in response to a request establishes a communications session between the requesting source computer and at least one physical display device only in the event that at least one condition is met. The at least one condition includes that a valid SCC is received with the request. The establishing is based on the received SCC. Related methods and computer programs are disclosed.

56 Claims, 7 Drawing Sheets

(56) References Cited

U.S. PATENT DOCUMENTS

| | | | | |
|---|---|---|---|---|
| 2003/0051139 | A1* | 3/2003 | Kubota | 713/168 |
| 2003/0072429 | A1 | 4/2003 | Slobodin et al. | |
| 2004/0083264 | A1* | 4/2004 | Veselov | 709/204 |
| 2004/0088680 | A1* | 5/2004 | Pieper et al. | 717/114 |
| 2004/0117662 | A1* | 6/2004 | Ong | 713/202 |
| 2004/0227900 | A1 | 11/2004 | Sato et al. | |
| 2005/0036509 | A1* | 2/2005 | Acharya et al. | 370/466 |
| 2005/0044384 | A1* | 2/2005 | Kimura | 713/183 |
| 2005/0078172 | A1* | 4/2005 | Harville et al. | 348/14.09 |
| 2005/0262507 | A1* | 11/2005 | Langen et al. | 718/100 |
| 2006/0195519 | A1* | 8/2006 | Slater et al. | 709/204 |
| 2007/0094413 | A1 | 4/2007 | Salazar et al. | |
| 2009/0235177 | A1* | 9/2009 | Saul et al. | 715/740 |

OTHER PUBLICATIONS

Xsecurity manual page. The XFree86 Project, Inc. Accessed on Jul. 1, 2010. Archived by the Internet Archive on Dec. 1, 2002: <http://web.archive.org/web/20021201185236/http://www.xfree86.org/current/Xsecurity.7.html>. pp. 1-4.*

Elizabeth D. Zwicky, Simon Cooper, D. Brent Chapman. "Building Internet Firewalls, Second Edition." O'Reilly Media: Jun. 2000. Chapter 18, Section 3 (pp. 1-14 as retrieved via O'Reilly Safari website).*

Daniel J. Barrett, Richard E. Silverman, Robert G. Byrnes. "SSH, The Secure Shell: The Definitive Guide, Second Edition." O'Reilly Media: May 2005. Chapter 9, Section 4 (pp. 1-14 as retrieved via O'Reilly Safari website).*

Transmittal; International Search Report; and the Written Opinion of the International Searching Authority for International Application No. PCT/CA2009/000532.

Abstract in English for CN 1550996 published Dec. 1, 2004.

Abstract in English for CN 139083 published Jan. 22, 2003.

Notification of the Second Office Action for Chinese Application No. 200980114633.2 with a mailing date of Sep. 3, 2013.

Extended European Search Report for European Patent Application No. 09 73 4658 with a mailing date of Apr. 24, 2013.

* cited by examiner

METHOD AND SYSTEM FOR COORDINATING DATA SHARING IN A NETWORK WITH AT LEAST ONE PHYSICAL DISPLAY DEVICE

FIELD OF THE INVENTION

The following relates generally to network communications and in particular, to an apparatus, system and method for coordinating data sharing in a network with at least one physical display device.

BACKGROUND OF THE INVENTION

The use of physical display devices for facilitating meetings is becoming increasingly popular. Depending on the environment, a physical display device may be one of a number of types (e.g., liquid crystal displays (LCDs), cathode ray tubes (CRTs), interactive displays such as interactive whiteboards (IWBs) or other display panels etc.) and/or different sizes and/or screen resolutions. Typically, however, a physical display device is provided with video data from the video card in a single computing device such as a personal computer or the like, and positioned in a meeting room so as to be visible to all meeting participants. Such a physical display device is used to present video data such as slides, video, photographs, charts, documents, application windows and the like for use during presentations and for discussion. In meetings having multiple contributors, multiple physical display devices may be used and each connected in various manners and according to various configurations with participants' respective source computers.

Multi-monitor computer systems may be provided in various configurations, such as those in which multiple physical display devices are connected to a single computing device, or in which each physical display device is connected to its own computing device, for example. Multi-monitor computer systems provide an increased display area for computer programs, and are becoming increasingly popular. In order to accommodate multiple physical display devices, video cards in many personal computers have multiple sockets or ports to receive cables from more than one physical display device. Alternatively, some personal computers have multiple video cards to receive cables from more than one physical display device. In either case, video data generated by the video card(s) of the computing device in response to execution of one or more computer programs is output to one or more physical display device for display. Other multi-monitor computer systems have networked physical display devices where the physical display devices are connected via a wireless or wired network and video data is provided to the physical display devices via the network connection for display.

It is often desirable during a meeting to coordinate and control upon which physical display devices certain users are permitted to display their video data. This can be done by predefining a set of destination addresses corresponding to physical display devices and using lookup tables to associate the respective IP addresses of user's devices with those of physical display devices in the network, or by user's devices specifying IP addresses of physical display devices or their controllers either directly or after having queried over the network as to which physical display devices are available. However it can be rather time-consuming to set up predefined lookup tables for each meeting, and flexibility for participants with such schemes is limited. On the other hand, enabling network users to send messages via their devices through the network to query as to which devices are available for display and make their own connections without restriction can pose security concerns. This is because the physical display devices are often part of a larger local or wide area network via which users that are authorized to use the network in general could gain access to the physical display devices meant for use by others during a particular meeting.

As will be appreciated, improvements in establishing communications sessions in a network for display of video data are desired. It is therefore an object of the present invention at least to provide a novel method for establishing communications sessions for displaying video data, and a novel system employing the method.

SUMMARY OF THE INVENTION

In accordance with one aspect, there is provided an apparatus for coordinating data sharing in a computer network, comprising:

an interface for connecting to each of at least two physical display devices;

a storage device storing associations between each of at least one unique temporary session connection code (SCC) and a respective at least one of at least two physical display devices, the storage device also storing a respective future SCC activation date or time;

an interface receiving requests from one or more source computers to establish communications sessions for sharing data; and a processor in response to a request establishing a communications session for directing data between the requesting source computer and the respective one of the at least two physical display devices only in the event that the request is received on or after the respective SCC activation date or time, and a valid SCC is received with the request, the establishing being based on the received SCC.

The SCC, after having been generated, may be provided to a particular user prior to the meeting by a meeting coordinator via email, over the telephone etc. Alternatively or in addition to having received the SCC beforehand, the user may be provided with the opportunity to view the SCC on the physical display device when the user has made visual contact with the physical display device.

In accordance with another aspect, there is provided a method for coordinating data sharing in a network with at least two physical display devices, comprising:

generating at least one temporary unique session connection code (SCC), the at least one SCC containing an identifier for a respective one of the at least two physical display devices;

associating each of the at least one SCC with a respective at least one of the at least two physical display devices and a future SCC activation date or time;

receiving requests from one or more source computers to establish a communications session for sharing data; and in response to a request, establishing a communications session for directing data between the requesting source computer and the respective one of the at least two physical display devices only in the event that a valid SCC is received in connection with the request, the request is received on or after the respective SCC activation date or time, and further wherein the establishing is based on the received SCC.

In accordance with another aspect, there is provided a method for establishing a communications session for sharing data, comprising:

generating a unique temporary session connection code (SCC) for a respective one of at least two physical display devices in a computer network, and associating the SCC with a future SCC activation date or time, the SCC containing an identifier for the respective one of the at least two physical display devices;

receiving the SCC at a user interface of a source computer in the network; and using the SCC, establishing a communications session for directing data between the source computer and the respective one of the at least two physical display devices via the network, only in the event that the SCC is received at the user interface on or after the SCC activation date or time.

In accordance with another aspect, there is provided a method of establishing a communications session for accessing a respective one of at least two resources in a network, comprising:

generating a unique temporary session connection code (SCC) for the resource and associating the SCC with a future SCC activation date or time, the SCC containing an identifier for the respective one of the at least two resources;

receiving the SCC at a user interface of a computing device in the network; and using the SCC, establishing a communications session for directing data between the computing device and the respective one of the at least two resources via the network only in the event that the SCC is received on or after the SCC activation date or time.

In accordance with another aspect, there is provided a system for establishing a communications session for displaying video data, comprising:

at least two physical display devices in a computer network;

a storage device storing a unique temporary session connection code (SCC) in association with a respective one of the at least two physical display devices and a future SCC activation date or time, the SCC containing an identifier for the respective one of the at least two physical display devices; and at least one source computer in the network having a user interface for receiving a SCC and in response, in the event that the SCC is received on or after the SCC activation date or time, executing a session establishing procedure controlling establishing of a communications session for directing data between the source computer and the respective one of the at least two physical display devices associated with the received SCC.

In accordance with another aspect, there is provided a method performed by a source computer in a computer network for establishing a communications session for sharing data, comprising:

providing a user interface for receiving a session connection code (SCC);

providing an SCC request including the received SCC to the network;

receiving a response to the SCC request from a controller; and establishing the communications session with the controller for sharing data between the source computer and the physical display device.

In accordance with another aspect, there is provided a system for establishing a communications session in a computer network, comprising:

at least one resource in the network;

a code generator generating a unique temporary session connection code (SCC) for association with the at least one resource; and at least one computer in the network having a user interface for receiving an SCC and in response executing a session establishing procedure controlling establishing of a communications session for accessing the resource associated with the received SCC.

In accordance with another aspect, there is provided a non-transitory computer readable medium embodying a computer program for coordinating data sharing in a network with at least two physical display devices, the computer program comprising:

program code for generating at least one temporary unique session connection code (SCC);

program code for associating each of the at least one SCC with a respective one of the at least two physical display devices, the at least one SCC containing an identifier for the respective one of the at least two physical display devices, and for storing a respective future SCC activation date or time;

program code for receiving requests from one or more source computers to establish a communications session for sharing data; and program code for, in response to a request, establishing a communications session for directing data between the requesting source computer and the respective one of the at least two physical display devices only in the event that the request is received on or after the respective SCC activation date or time, and a valid SCC is received in connection with the request, and further wherein the establishing is based on the received SCC.

In accordance with another aspect, there is provided a non-transitory computer readable medium embodying a computer program for establishing a communications session for sharing data, the computer program comprising:

program code for generating a unique temporary session connection code (SCC) for a respective one of at least two physical display devices in a computer network, the SCC containing an identifier for the respective one of the at least two physical display devices, and for associating the SCC with a future SCC activation date or time;

program code for receiving the SCC at a user interface of a source computer in the network; and program code for, using the SCC, establishing a communications session for directing data between the source computer and the respective one of the at least two physical display devices via the network only in the event that the request is received at the user interface on or after the SCC activation date or time.

In accordance with another aspect, there is provided a non-transitory computer readable medium embodying a computer program for establishing a communications session for accessing a respective one of at least two resources in a network, the computer program comprising:

program code for generating a unique temporary session connection code (SCC) for the respective one of the at least two resources and for associating the SCC with a future SCC activation date or time, the SCC containing an identifier for the respective one of the at least two resources;

program code for receiving the SCC at a user interface of a computing device in the network; and program code for using the SCC, establishing a communications session for directing data between the computing device and the respective one of the at least two resources via the network only in the event that the SCC is received on or after the SCC activation date or time.

In accordance with another aspect, there is provided a non-transitory computer readable medium embodying a computer program for coordinating data sharing in a network with at least two physical display devices, the computer program comprising:

program code for generating at least one temporary unique session connection code (SCC);

program code for associating each of the at least one SCC with a respective one of the at least two physical display devices and a future SCC activation date or time, the at least one SCC containing an identifier for the respective one of the at least two physical display devices;

program code for receiving requests from one or more source computers to establish a communications session for sharing data; and program code for in response to a request, establishing a communications session for directing data between the requesting source computer and the respective one of the at least two physical display devices only in the event that a valid SCC is received in connection with the request, and the request is received on or after the SCC activation date or time, and further wherein the establishing is based on the received SCC.

The method and system of the invention enable control and coordination of the sharing of data between source computers and physical display devices during meetings and the like. The use of session connection codes (SCCs) according to the invention enables authentication, privacy and identification for establishing the communications session. This reduces the chance of unauthorized access to a physical display device that is intended for use during a particular session, while maintaining flexibility for coordinating the session.

BRIEF DESCRIPTION OF THE DRAWINGS

Embodiments will now be described more fully with reference to the accompanying drawings, in which.

DETAILED DESCRIPTION OF THE EMBODIMENTS

Figure 1:
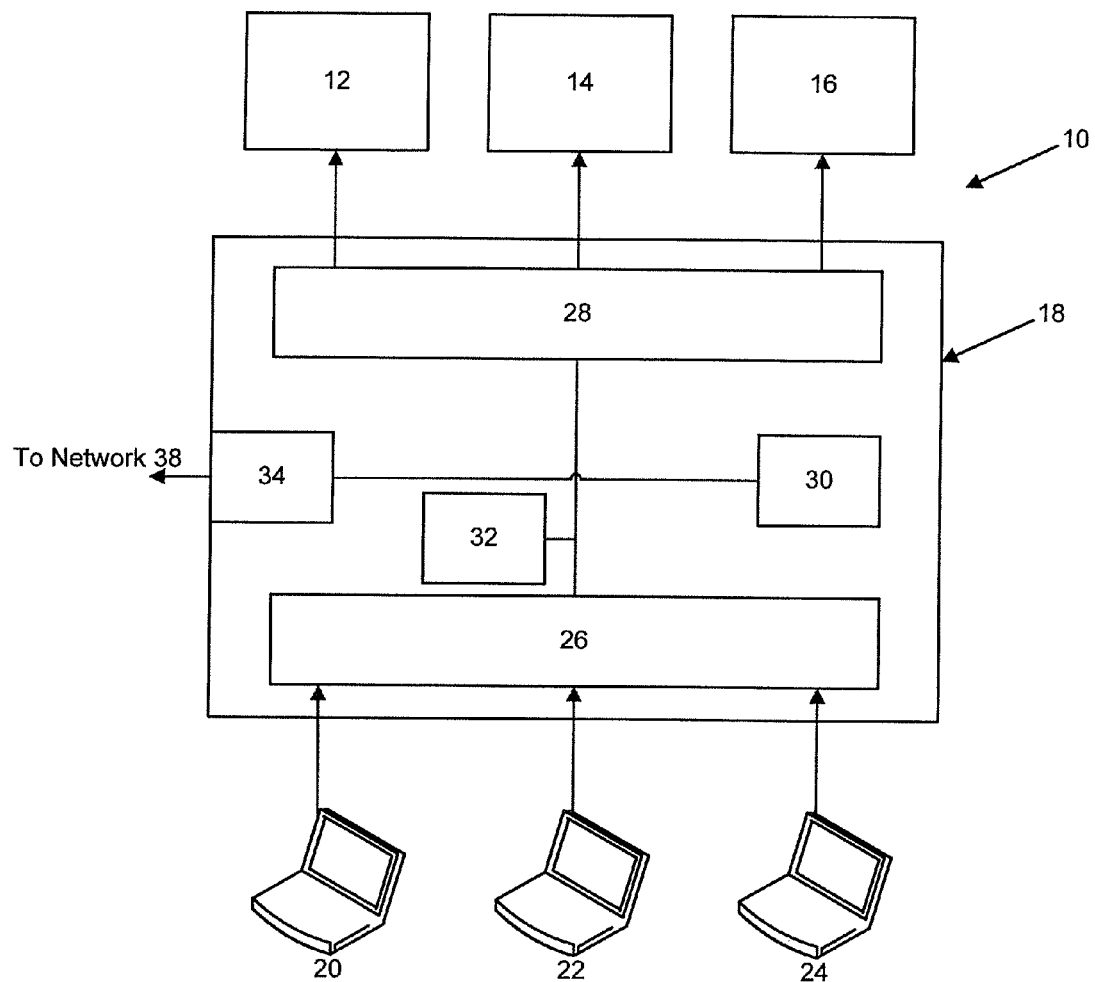
FIG. 1 is a schematic representation of a multi-monitor computer system.

Turning now to FIG. 1, a multi-monitor computer system is shown and is generally identified by reference numeral 10. As can be seen, in this embodiment the multi-monitor computer system comprises a plurality of physical display devices 12,14 and 16, each of which is connected to a common, or "central", controller, in this embodiment a personal computer 18 in a network. The term "network" as used herein refers to a set of electronic devices and the various means by which they may be interconnected for communicating data (e.g., via Ethernet, USB or other wired protocol, wirelessly via WiFi, 802.15.4, BlueTooth™ or other wireless protocol, and/or IR etc., via a hub or directly etc.).

The physical display devices 12, 14, 16 may take a variety of forms. For example, the physical display devices may be monitors (i.e., liquid crystal displays (LCDs), cathode ray tubes (CRTs), plasma display devices or other type of display panel such as televisions or cellphone displays) of the same type or of different types and/or may be of the same or different resolution. Alternatively, the physical display devices 12, 14, 16 may be interactive whiteboards (IWBs). Each IWB may be one of a number of types including but not limited to analog resistive, capacitive, camera-based, electromagnetic, surface acoustic wave etc. Of course, the physical display devices 12, 14, 16 may be a combination of monitors and IWBs.

One or more other source computing devices also communicate with the personal computer 18. In this embodiment, three (3) laptop computers 20, 22, 24 are the source computers. The laptop computers 20, 22, 24 may communicate with the personal computer 18 over wired communication links such as for example Ethernet or universal serial bus (USB) connections, or may communicate with the personal computer 18 over wireless communication links such as for example radio frequency (RF) connections such as established using BlueTooth™.

The laptop computers 20, 22, 24 include respective processors (not shown), and non-volatile memory (not shown) either on their hard drive, EEPROM, flash drive (or other non-volatile memory) or an external storage device such as a USB (Universal Serial Bus) key. The non-volatile memory of the laptop computers 20, 22, 24 stores instructions for execution by respective processors to provide a user interface 21 for receiving a session connection code (SCC) and if certain conditions are met executing a session establishing procedure for establishing a communications session for sharing data between the respective laptop and the physical display device associated with the received SCC, as will be described in further detail below.

For the purposes of this application, "monitor" and "physical display device" will be used interchangeably to refer to any of a monitor as set out above, an IWB, or any other such physical display device.

The personal computer 18 functions to display video data from the multiple source laptop computers 20, 22, 24 in the multi-monitor computer system 10, as described in U.S. provisional patent application Ser. No. 61/019,553 to SMART Technologies ULC, of Calgary, Alberta, Canada, the contents of which are incorporated in their entirety herein by reference. The personal computer 18 includes a source computer interface 26 for receiving video data from the multiple laptop computers 20, 22, 24. Depending upon the implementation, the source computer interface 26 may be a single device for handling wired and/or wireless communications links with the laptop computers 20, 22, 24, or comprise a set of source computer interface devices each of which handles communication with a respective one of the laptop computers 20, 22, 24. The personal computer 18 also includes a multi-monitor interface 28 for providing video data to the physical display devices 12, 14 and 16. Depending upon the implementation, the multi-monitor interface 28 may be a single device for handling wired and/or wireless communications links with the physical display devices 12, 14, and 16, or comprise a set of monitor interface devices each of which handles communication with a respective one of the physical display devices 12, 14, 16.

The personal computer 18 includes a processor 30 that, under the instructions of software stored in non-volatile memory 32 and executed in system memory as is well known, coordinates the provision of received video data via the multi-monitor interface 28 to the physical display devices 12, 14, 16.

The memory 32, in addition to storing software for coordinating the multi-monitor computer system 10, stores user-adjustable and non-user-adjustable configuration parameters for use during the coordinating. The memory 32 is also configured to stored video data for optional screen capture and other purposes, such as for file sharing and transfer between and amongst the laptop computers 20, 22, 24 and the personal computer 18, as desired. External memory devices (not shown) may be connected to the personal computer 18 for this purpose also.

The personal computer 18 also includes a network interface 34 interconnected with the other components of the personal computer 18 to send and receive video data and handle display requests from remote source computers (not shown) via a network 38. The network interface 34 may also be used to provide access to another network device (not shown), such as a storage device.

Figure 2:
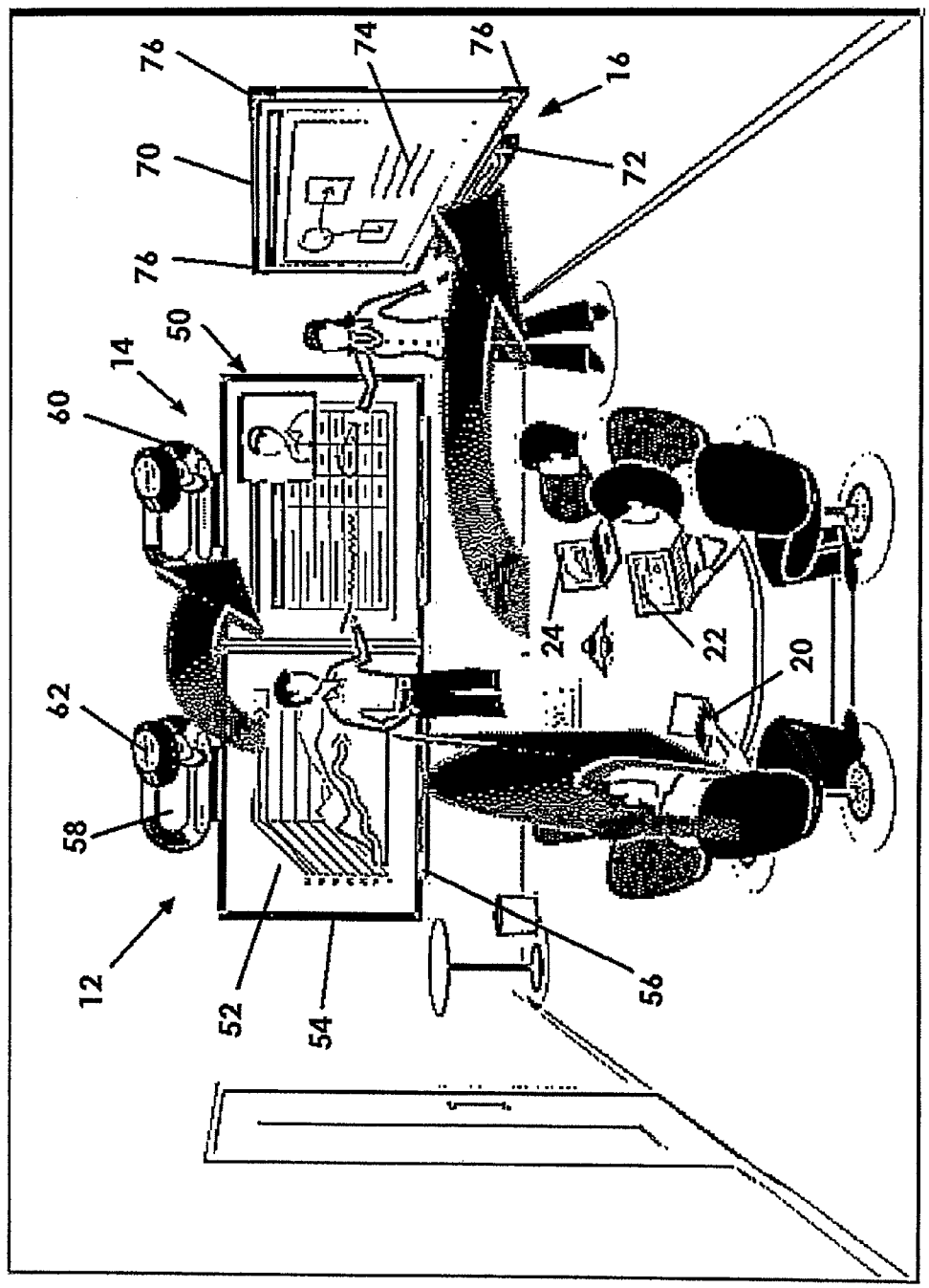
FIG. 2 shows a multi-monitor computer system deployed in a meeting room and comprising a plurality of interactive whiteboards connected to a single personal computer and a plurality of laptop computers.

FIG. 2 shows the multi-monitor computer system 10 deployed in a meeting room and with the physical display devices 12, 14, 16 taking the form of interactive whiteboards (IWBs) mounted on the walls of the meeting room at different spaced locations. Each IWB 12, 14, 16 is connected to the personal computer 18 either via a cable that is received by a respective socket of a video card installed in the personal computer 18 or via a network connection such as Ethernet. The laptop computers 20, 22, 24 in this configuration communicate with the personal computer 18 via wireless communication links.

In this embodiment, the IWBs 12 and 14 are 600i series interactive whiteboards manufactured by SMART Technologies ULC, of Calgary, Alberta, Canada, assignee of the subject application. As can be seen, each IWB 12, 14 comprises an analog resistive touch screen 50 having a touch surface 52. The touch surface 52 is surrounded by a bezel 54. A tool tray 56 is affixed to the bezel 54 adjacent the bottom edge of the touch surface 52 and accommodates one or more tools that are used to interact with the touch surface 52.

A boom assembly is mounted above the touch screen 50 via a mounting bracket 58. The boom assembly comprises a generally horizontal boom 60 that extends outwardly from the mounting bracket 58 and supports a projector 62 adjacent its distal end. The projector 62 is aimed at the touch screen 50 so that the image projected by the projector 62 is presented on the touch surface 52.

During operation of each IWB 12, 14, each projector 62 receives video output from the personal computer 18 and projects a video image onto the touch surface 52. The video image may be the desktop of the personal computer 18 or the desktop of one of the laptop computers 20, 22, 24. When a user contacts the touch surface 52 with a pointer such as a finger, pen tool, or other object, the contact is detected by the IWB and the position of the contact in touch screen (x,y) coordinates is conveyed to the personal computer 18. The personal computer 18 in response maps the touch screen (x,y) coordinates to the computer display coordinates and processes the resultant input. Depending on the nature of the resultant input, the touch surface contact may be treated as writing or drawing or as a mouse event. As a result, pointer contacts on and pointer movement across the touch surface 52 can be recorded by the personal computer 18 as writing or drawing or used to control execution of one or more application programs loaded on the personal computer 18.

In general, when one of or both IWBs 12,14 are displaying video data from a source computer such as laptop computer 20, the recorded contacts and movement are communicated back to laptop computer 20 via personal computer 18 to be recorded as writing or drawing, or used to control execution of one or more applications loaded onto laptop computer 20. The personal computer 18 also updates the video output conveyed to the projector 62 so that the video image presented on the touch surface 52 reflects the pointer activity.

The IWB 16 is a DViT camera-based interactive whiteboard manufactured by SMART Technologies ULC, of Calgary, Alberta, Canada, assignee of the subject application. The IWB 16 comprises a rectangular bezel or frame 70 surrounding the display screen of a projection device such as for example a plasma display or LCD. A tool tray 72 is affixed to the bezel 70 and accommodates one or more pen tools that are used to interact with the projection device. The projection device receives video output from the personal computer 18 and displays a video image on its display screen 74. Digital cameras 76 are provided adjacent three (3) corners of the bezel 70. The digital cameras 76 have overlapping fields of view that encompass and look across the display screen 74.

During operation, the digital cameras 76 acquire images generally looking across the display screen 74 from different viewpoints and generate image data. Image data acquired by the digital cameras 76 is processed by on-board digital signal processors to determine if a pointer exists in the captured image data. When it is determined that a pointer exists in the captured image data, the digital signal processors generate pointer information packets (PIPs) and convey the PIPs to a master controller. Upon receipt of the PIPs, the master controller processes the PIPs using triangulation to determine the location of the pointer in the captured images relative to the display screen (x,y) coordinates. In this manner, as PIPs are generated in response to captured images, the position and movement of the pointer over the display screen can be tracked turning the display screen 74 of the projection device into an interactive touch surface. The display screen (x,y) coordinates generated by the master controller are conveyed to the personal computer 18. Similarly, the personal computer 18 in response maps the display screen (x,y) coordinates to computer display coordinates and processes the resultant input. Depending on the nature of the resultant input, the display screen 74 contact may be treated as writing or drawing or as a mouse event. As a result, pointer contacts on and pointer movement across the display screen 74 can be recorded by the personal computer 18 as writing or drawing or used to control execution of one or more application programs loaded on the personal computer 18. The personal computer 18 also updates the video output conveyed to the projection device so that the video image presented on its display screen 74 reflects the pointer activity.

Figure 3:
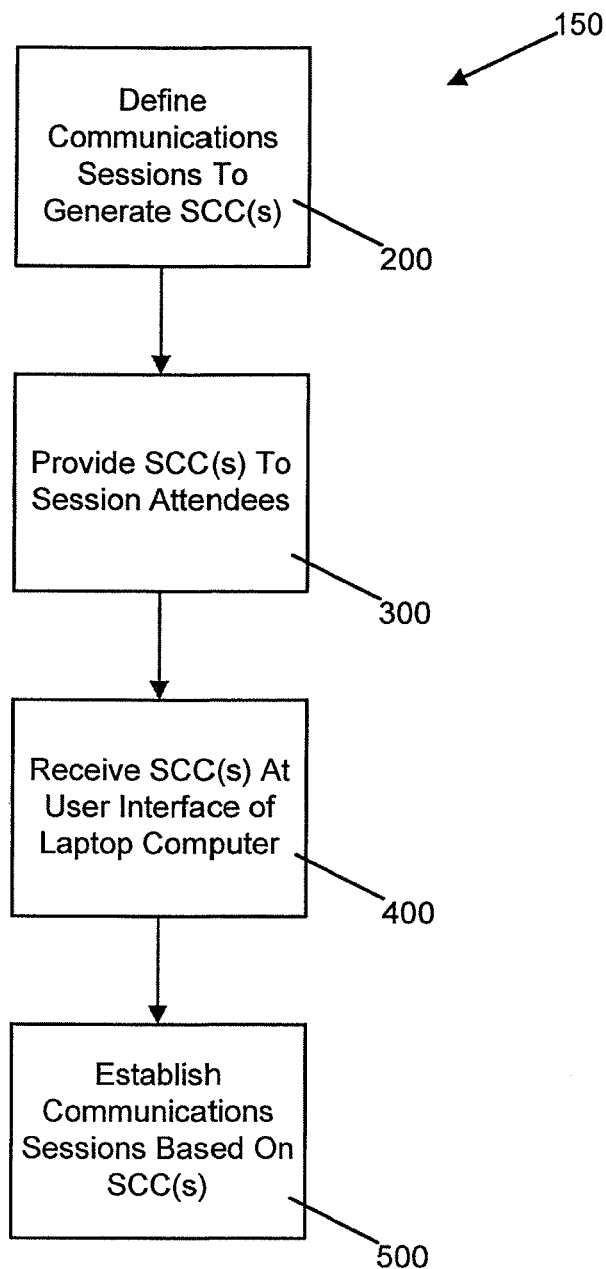
FIG. 3 is a flowchart showing a process for coordinating sharing of data including defining and establishing communications sessions.

FIG. 3 is a flowchart showing a process 150 for coordinating sharing of data between the laptop computers 20, 22, 24 and the IWBs 12, 14, 18. Using a software program running on personal computer 18, at least one communications session is defined to generate at least one unique session connection code ("SCC") (step 200). The at least one SCC is then provided to one or more users who are, or are to be, meeting attendees (step 300). The at least one SCC is then received from meeting attendees to which the at least one SCC has been provided, at a user interface 21 (step 400). At least one communications session is then established for sharing data between the laptop computers 20, 22, 24 and the IWBs 12, 14, 16 based on the received SCC(s) (step 400).

Figure 4A:
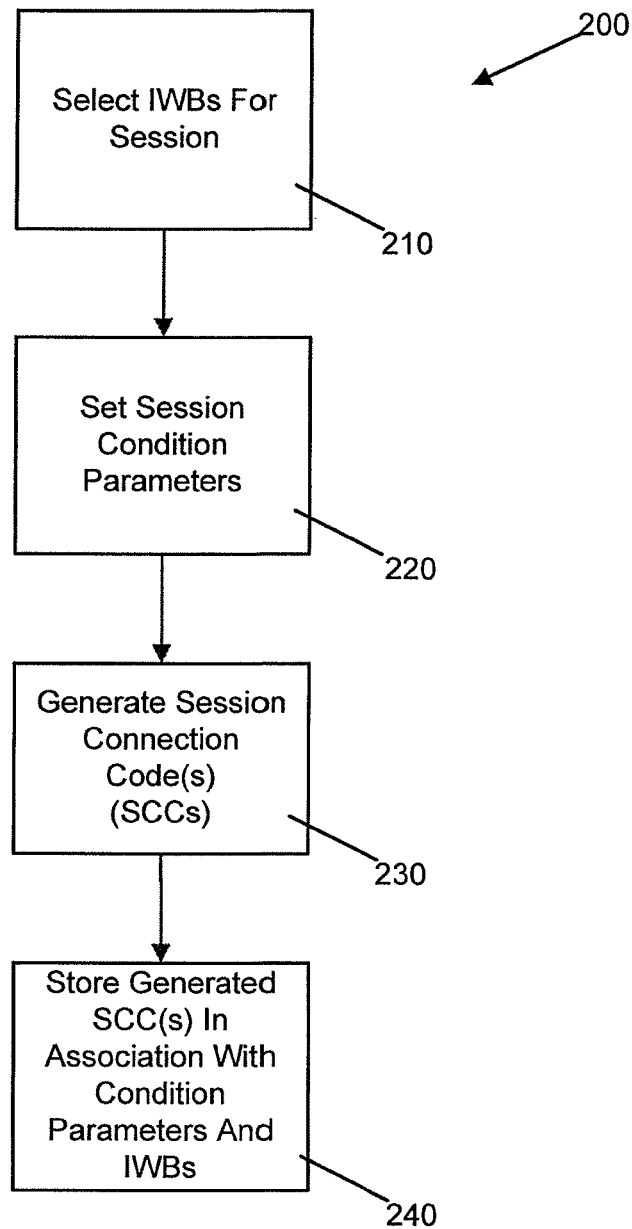
FIG. 4a is a flowchart that illustrates the process for defining a communications session.

FIG. 4a is a flowchart that illustrates the process for defining a communications session (step 200). Using the software program running on personal computer 18, a user (typically the meeting coordinator or chair) selects the IWBs for the anticipated session (step 210), and sets session condition parameters (step 210). While setting session condition parameters, the user can define the session in terms of its name, the date and time during which the session will occur, the invitees, and so forth.

For example, the meeting coordinator may select IWBs 12, 14 and 16, and specify that the "New Feature Brainstorming" meeting will occur on upcoming July 31, between 3:00 and 5:00 p.m., and that Matt, Charlotte and Thomas and Gail will be invited.

With the IWBs having been selected as desired, further session condition parameters may be specified by the meeting coordinator, including respective SCC expiry dates after which the SCCs will be considered invalid and therefore unable to be used for establishing a communications session with the IWB(s). This may default to the specified end-time of the session, or may be set to another time by the meeting coordinator. Further session condition parameters include an SCC activation date before which the SCCs will be considered invalid and therefore not yet usable for establishing a communications session with the IWB(s).

Further selectable session condition parameters include specifying whether an SCC is considered invalid/expired after its first use for establishing a communications session, whether or not a physical display device is permitted to share data with more than one source computer, whether a source computer is permitted to share data with more than one physical display device, whether a request by a source computer is to be queued in the event that a communications session with the at least one physical display device associated with the received SCC has already been established with another source computer, and so forth.

Further session condition parameters include specifying whether, in the event that a communications session with the at least one physical display device associated with a received SCC has already been established with another source computer, a communications session is to be established with at least one available physical display device with which the received SCC is not associated.

Further session condition parameters include whether a single SCC is to be used by all invitees, or alternatively whether each invitee will be allocated his/her own IWB for the session. As one session condition parameter, an IWB may be provided with special status. For example, a particular IWB may be designated, while defining the communications sessions, as "Remote". This session condition parameter causes the SCC code generator to ensure that a unique SCC is generated for association with the "Remote" IWB, so that certain invitees that are not within the meeting room but are instead connected to the network from outside the meeting room are provided with a dedicated display for use during the meeting.

Based on the specified session condition parameters, and on the selected IWBs, one or more SCCs are generated. As a default, only one SCC is generated for use by all meeting participants. However, in the event that a session condition parameter is specified so as to require multiple unique SCCs either to track participation in the meeting, or to ensure that certain users may share data from their laptop with one or more particular IWB, or to enable the personal computer 18 to discern between the multiple display devices to which it is connected, multiple SCCs will be generated.

A generated SCC is temporary in the sense that in accordance with the condition parameters, it has a limited lifetime during which it is usable for establishing a communications session for sharing data between a source computer and a physical display device. For example, in the event that the IWB 14 is to be used for a subsequent meeting, any previous SCC associated with the IWB 14 becomes invalid due to expiry or positive action by the meeting coordinator, and a new temporary unique SCC is generated for the IWB 14.

The generated SCC is unique in the sense that it is randomly selected as will be described to avoid being the same as an SCC generated for another physical display device within the same network. While random selection alone cannot guarantee true uniqueness, random selection from a large number of possible choices provides for a high probability of uniqueness, while also providing for higher security and flexibility when compared to a scheme that predetermines SCCs in order to guarantee true uniqueness. Uniqueness of the SCC is advantageous for avoiding conflicts between physical display devices that may be accessible on the same extended network but intended for different meetings in different rooms. For example, if two SCCs for two different physical display devices were the same, there would be a conflict over the common network as to which physical display device video data should be sent. The uniqueness avoids this situation.

Figure 4B:
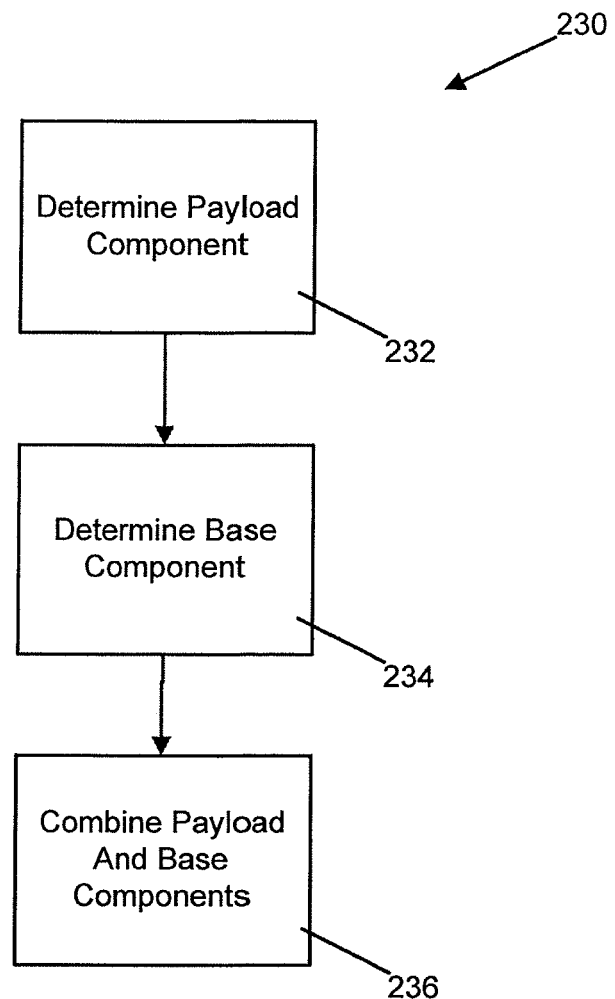
FIG. 4b is a flowchart that illustrates the process for generating a session connect code (SCC) during defining the communications session.

FIG. 4b is a flowchart that illustrates the process for generating a session connect code (SCC) (step 230) during defining the communications session. In order to facilitate meeting coordination and setup, it is advantageous that the SCC be easy and simple for a user to enter into a user interface such as the user interface 21 of the laptop computer 20.

The SCC is comprised of a base component and a payload component. First, the payload component is determined (step 232). The payload component includes both the network address of the personal computer 18, and a physical display device identifier for distinguishing the IWB 14 connected to the personal computer 18 from all other devices connected to the personal computer 18. During determination of the payload component, in the interest of keeping the SCC simple, redundancies are removed from the network address. For example, most local networks of Class B or Class C use 172.16.*.* or 192.168.*.* as standard subnets, and still provides a number of distinct addresses. As such, rather than use the entire IP address, using the remainder of the subnet can be just as effective, while reducing the size of the payload component. It will be understood that the scope of redundancy removal depends upon the number of unique network devices on the subnet, and in some cases, such as in larger organizations, no redundancy removal will be possible.

Once the redundancies of the network address, if any, have been removed, the physical display device identifier, taking the form of a number or letter that is reconcilable by the personal computer 18 with its own internal device registry, is added to the payload component to complete determination of the payload component.

With the payload component having been determined, the base, or "security" component is then determined (step 234). During determination of the base component, administrator-determined parameters are taken into account, such as the overall desired length of the SCC. It will be understood that a shorter SCC is easier for a user to enter into a user interface, but does not provide as effective a security mechanism as does a longer SCC. As such, an administrator can adjust a parameter for overall SCC length as desired. Other adjustable parameters include the desired character sets (alphabetical, numeric, and/or symbolic), and ineligible characters (such as certain numbers than appear similar to certain letters and so forth).

For the purpose of the following, the base component is randomly generated at a desired length from combinations of the set of upper case letters A to Z, the set of numbers 0 to 9, minus characters "0", "O", "1", "2", "5", and "S", each of which may be confused by a user with one or more other characters and are therefore deemed ineligible. This set of thirty (30) eligible characters (A to Z, 0 to 9, minus 6 ineligible characters) will be referred to as set A in the following description.

In order to form the base component of the SCC, a random sequence of L characters (wherein L corresponds to the overall desired length of the SCC minus the number of characters forming the payload component) is selected from set A. For example, where L is four (4), there are $28^4=614656$ different base components from which to randomly select.

It will be understood that there is a trade-off between the size of the base component and the payload component, for a given overall SCC length. While an SCC with a payload component that includes a network address and a physical display device identifier is preferred, one method of reducing the required size of the payload is have no valid network address in the payload altogether and require the laptop computer 20 to broadcast the SCC across the network, instead of communicating only with the personal computer 18 while establishing the communications session. Broadcasts can be conducted using TCP/IP, for example, or User Datagram Protocol (UDP) or similar. As will be understood, this scheme requires that devices on the network listen for an SCC request whereas only the personal computer 18 controlling the associated IWB responds. In some instances, such as those where each controller in the network is connected to only one physical display device, or that each physical display device communicates directly over the network (i.e., not via a controller), a physical display device identifier in the payload component is not actually required. In such a case, there is provided the opportunity to further increase the number of combinations from which to randomly select the base component, for a given SCC code length. It will be understood therefore that depending upon the configuration and requirements of system 10, a payload component may include only a network address, only a physical display device identifier, both a network address and a physical display device identifier, or neither the network address nor the physical display device identifier (i.e., no payload component).

Once the payload and base components of the SCC have been determined, they are combined into a final SCC. This is done simply by concatenating the base and payload components. In the event that further obfuscation is desired, the base and payload components are interleaved, and/or encrypted, and/or compressed.

With one or more SCCs having been generated, the SCCs are stored in a database table in memory 32 as records, in association with the one or more respective IWBs, and in association with the condition parameters discussed above that have been specified by the meeting coordinator.

With one or more SCCs having been generated as described above, one or more meeting invitees are then provided with an SCC prior to a meeting by the meeting coordinator (step 400). This is done manually by email, telephone or the like. Alternatively, the meeting coordinator can choose to provide the SCCs automatically using the software on controller 18 via email, after having generated the SCCs. Preferably, the SCCs are also provided by the IWB displaying the SCC as illustrated in FIG. 5, for example, for viewing by an invitee just before the meeting.

Figure 5:
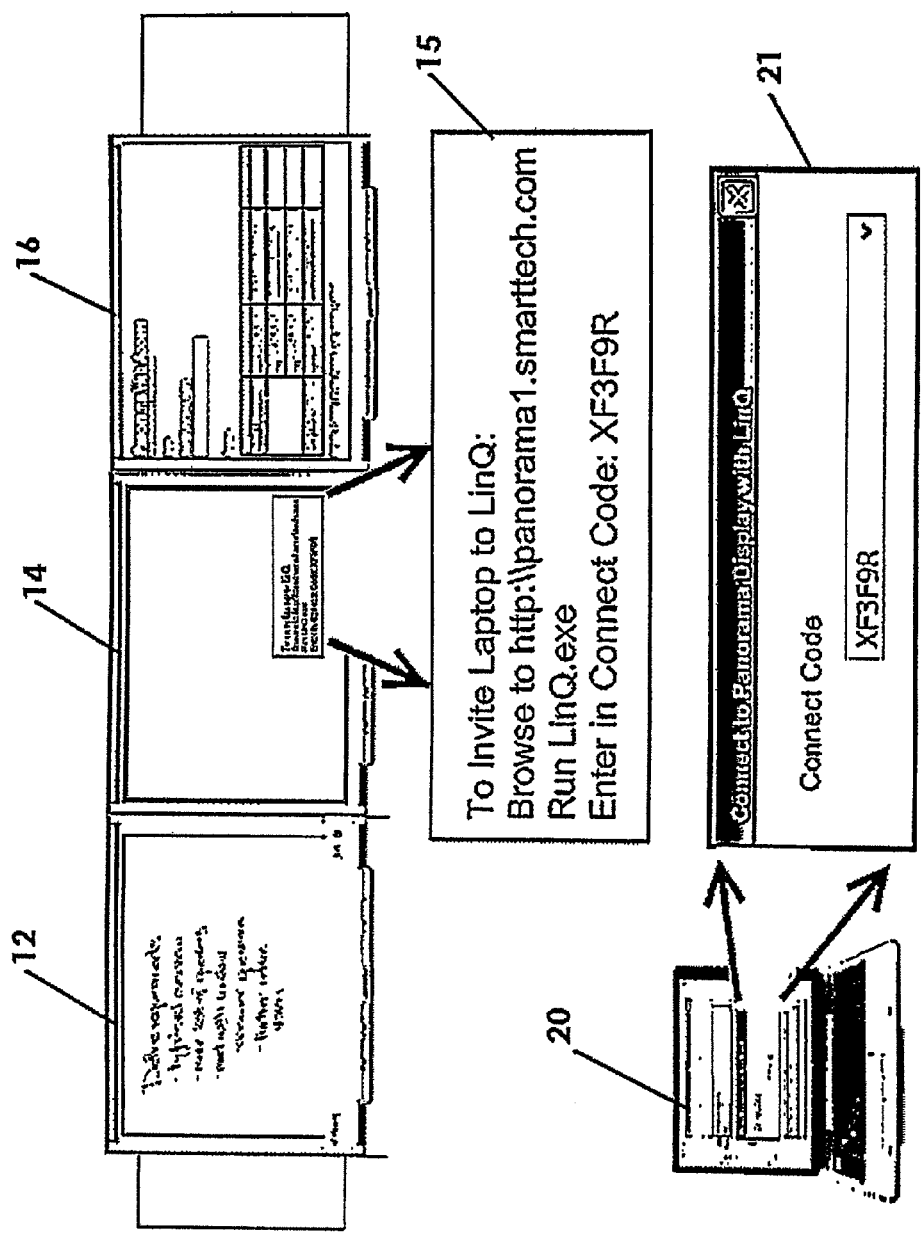
FIG. 5 shows the interactive whiteboards and a laptop computer, the desktop of the laptop computer providing a user interface for receiving an SCC for establishing a communications session for sharing data.

FIG. 5 shows the IWBs 12, 14, 16 and laptop computer 20. The desktop of the laptop computer 20 provides a user interface 21 for receiving an SCC for establishing a communications session for sharing data. In FIG. 5, the SCC is provided to the user of the laptop computer 20 in the message 15 displayed on the IWB 14. For ease of understanding, the following process for establishing a communications session will be described with respect to a communications session for sharing data between laptop computer 20, and IWB 14.

In order to establish the communications session for sharing data between the laptop computer 20 and the IWB 14, the user connects the laptop computer 20 to the network to which the personal computer 18 controlling the IWB 14 is also connected. A software program is then launched on the laptop computer 20 to display the user interface 21, and the user enters the SCC into the laptop computer 20 via the user interface 21 to initiate the communications session. It will be understood that the software program launched on the laptop computer 20 could be made available to the laptop prior to the meeting via download, could be provided on-demand on a USB key or USB cable device (similar to GoWire™), or could be provided via a browser applet (e.g., ActiveX, Web 2.0, Ajax, etc.) on a default page for guests of the network.

Figure 6:
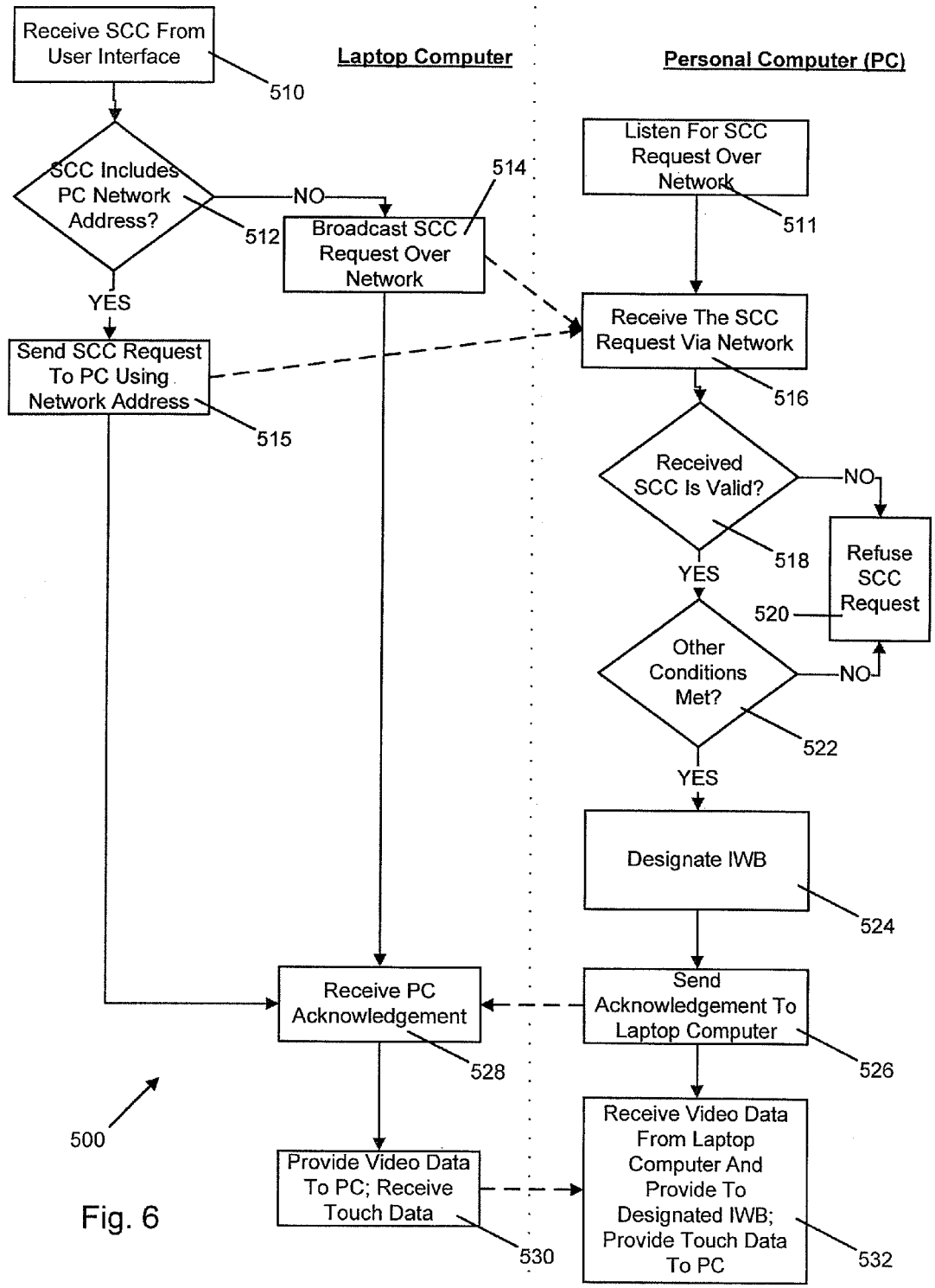
FIG. 6 is a flowchart that illustrates the process for establishing the communications session using the SCC.

FIG. 6 is a flowchart that illustrates the process for establishing the communications session using the SCC that has been entered into the laptop computer 20 via the user interface 21. FIG. 6 is divided into the related steps conducted during this process by the laptop computer 20, and the personal computer 18. First, computer software on the laptop computer 20 receives the SCC from the user interface 21 as described above (step 510), and divides the SCC into its base and payload components. In the event that the payload component includes the network address of the personal computer 18 (step 512), the laptop computer 20 sends an SCC request to the personal computer 18 across the network using the network address (step 515). Otherwise, the laptop computer 20 broadcasts the SCC request across the network using UDP (step 514).

The personal computer 18 listens for the SCC request over the network (step 511) and once the SCC request is received either via broadcast or directly (step 516), the personal computer 18 determines whether the received SCC is valid (step 518). This is done by referring to the database table in memory 32 described above, and determining whether there is an entry in the table including the received SCC. If there is no such entry, then the received SCC is considered invalid, and the SCC request is refused (step 520). Otherwise, it is determined whether other conditions have been met (step 522). Determining whether other conditions have been met includes determining the condition parameters associated with the SCC, and based on the condition parameters and existing communications sessions, determining whether the laptop computer 20 is permitted to share data with IWB 14 at this time. For example, depending upon the conditions parameters, the SCC request may be refused (step 520) if another laptop computer 22 is already sharing data with IWB 14, or placed in a queue until such time as the other laptop computer 22 has closed its communications session with IWB 14.

In the event that the other conditions are met, the IWB 14 associated in the database table with the received SCC is designated by the personal computer 18 (step 524), and an acknowledgment is sent to laptop computer 20 in response to the SCC request (step 526). Upon receipt of the acknowledgment (step 528), laptop computer 20 is able to share data with IWB 14, including providing video data to IWB 14 via controller 18 and receiving touch data from IWB 14 via controller 18 as appropriate (step 530). Similarly, IWB 14 is able to share data with laptop computer 20, including receiving video data from laptop computer 20 via controller 18 and providing touch data via controller 18 to laptop computer 20 (step 532).

Contacts and movement on the IWB 14 are transmitted during the communications session back to the laptop computer 20 via the personal computer 18 as touch data to be recorded as writing or drawing and/or to control launching an operation of software applications running on the laptop computer 20.

In order to coordinate the sharing of data where multiple source computers are sharing data with a particular physical display device, the controller 18 acts as data router. Thus, the controller 18 creates "virtual" displays in respective windows on the particular physical display device, each "virtual" display corresponding to a particular source computer. The controller 18 routes data to and from the appropriate source computer and the physical display device based on the touch activity within the currently active window and the activity coming from the respective source computers.

In order to coordinate the sharing of data where a single laptop computer is sharing data with multiple physical display devices, the controller 18 also acts as data router. In this case, the single laptop computer has multiple applications running (e.g., its desktop and at least one another application, or multiple non-desktop applications), and the controller 18 routes data to and from the appropriate source application and the respective physical display device based on the touch activity within the particular display device and the activity coming from the respective applications.

It will be understood that the video data is prepared by the laptop computer 20 for display on IWB 14 in the same way that video data is prepared for the display on the local display of laptop computer 20. The video data is then processed for transmission to the personal computer 18 across the wired or wireless connection between the laptop computer 20 and the personal computer 18. Typically, the video data is compressed and encoded in order to maintain the integrity of the video data during transmission across the network, and to reduce the amount of video data being sent. The processed video data is then sent to the personal computer 18 and provided by the personal computer 18 to the IWB 14 for display.

During the communications session, video and other data is stored in the memory 32 of the personal computer 18 in association with the SCC for enabling retrieval of the stored data by using the SCC as an access code, after the meeting by a participant or an absent invitee that had been provided with the SCC.

Video data may be provided by the laptop computer 20 to the personal computer 18 for display by the IWB 14, and touch data provided to the laptop computer 20 accordingly, until such time as the communications session is terminated. Termination of the communications session may be done manually by a user of the laptop computer 20, a user of the personal computer 18, either as a soft termination or by turning off or unplugging laptop computer 20 or IWB 14 from the network, or automatically according to predetermined settings that, for example, relate to the expected duration of a meeting.

The above process for establishing a communications session has been described with respect to one laptop computer 20 and one IWB 14. It will be understood, however, that this has been done for simplicity of description and that a fully functioning multi-monitor computer system 10 may have many local and/or remote source computers and many monitors being coordinated simultaneously so as to achieve real-time and simultaneous display of video data from the multiple source computers in the multi-monitor computer system 10.

While embodiments employing a single personal computer 18, a single laptop computer 20, and a single IWB 14 have been described, it will be understood that multiple such personal computers 18 or other types of controllers may be interconnected so as to provide greater scope for display of video data from multiple sources. For example, multiple meeting sites, each having a respective personal computer 18, could be interconnected via a peer-to-peer connection between the personal computers 18. This would enable source computer video data connected to one personal computer 18 at one meeting site to be shared via the peer-to-peer connection with meeting participants at another meeting site, and vice-versa. To assist with coordination of this scope of system, a meeting coordinator may find it useful to designate via configuration settings that one or more physical display devices in a meeting room are designated as "remote", whereas the remainder are designated as "local". This might be achieved by limiting the choices available to local source computers in order to provide video data to those physical display devices reserved as remote, and generating and distributing SCCs based on these limitations.

Furthermore, the above-described process for establishing a communications session may be used as desired to coordinate the display of video data where there is a single physical display device, multiple physical display devices, a single source computer, multiple source computers, a single controller, multiple controllers, no controllers (i.e., where the physical display device has its own embedded processing unit and communicates directly with other devices via the network), and/or multiple displays per controllers, and so forth.

The above-described process for establishing a communications session may also be used where network communications between a source computer and a physical display device are provided via one, none or multiple network devices. Where there are intervening network devices, such as one or more Web servers, for example, a dynamic lookup table may be stored on the intervening network device to associate a generated SCC with the network address of a controller in order to enable a source computer accessing the internal network via the Web server to establish a communications session with the controller. The Web server could alternatively perform a UDP broadcast on behalf of the source computer using the SCC to initiate the communications session between the source computer and the controller.

The invention is not limited for use with laptop source computers, but may be used with various types of portable computers such as cellular telephones, PDAs (personal digital assistants), thin clients, or desktops, functioning as source computer and/or personal computer 18.

While the embodiments described above relate to entry of an SCC into a user interface by typing, it will be understood that other methods of providing the source computer with an SCC may be used for establishing the communications session. For example, rather than typing an SCC into a graphical user interface on a source computer such as user interface 21, launching of a software program embedded in an email to the user and coded with the SCC can be considered by the user interface software to be equivalent to the user's entry into the source computer's user interface of the SCC by typing (i.e., a desire by user to establish the communications session) and therefore sufficient to initiate the establishment of the communications session. Alternatively, the SCC could be encoded in a sound file and played in the presence of the controller which, having a microphone, could receive and recognize the sound file to extract the SCC for establishing a communications session. Similarly, modulated light, or wireless RF transmissions between source computer and controller could initiate the communications session also. In each case, the SCC is considered in the broad sense to have been received by a user interface of the source computer, because its provision to the above-described software for establishing the communications session has been directed by the user of the source computer.

For additional security, an optional condition parameter specified by an administrator is the number of times a particular invalid SCC can be received in SCC requests from a particular source computer (as identified by its network address, for example), before the source computer is prevented from sharing data by way of lockout. The administrator would be alerted and be given the opportunity to assess the situation and reset the lockout for the source computer, as desired.

The above described process for establishing a communications session is not limited to one-to-one communications session between a source computer and a physical display device. For example, a SCC could be generated for a first physical display device, and used to establish a communications session between the first physical display device and a second physical display device (either directly or via a controller), so that data from a source computer with which a communications session has also been established can be displayed on both physical display devices. The controllers in this case could also share data as peers.

The above described process for establishing a communications session may also be used in conjunction with the GoWire™ system (or similar) provided by SMART Technologies ULC of Calgary, Alberta, Canada, the assignee of the subject application. Briefly, GoWire™ is a cable connecting a laptop or other computer with the IWB, that includes an embedded USB key storing applications and drivers that would be required by a guest laptop to share data with the IWB.

While embodiments described above relate to providing video data for display on physical display devices, the method for establishing a communications session is more broadly applicable to accessing resources such as files, objects, database records and the like in a network. For example, a temporary and unique SCC could be generated by a file server for a resource, such as a file, in the network. A communications session permitting access to the file by one or more computers in the network would be based on the SCC being received at the user interface of one or more computers in the network.

The system described above for establishing a communications session and described methods may comprise or be implemented in whole or in part by program modules including but not limited to routines, programs, object components, data structures etc. and may be embodied as computer readable program code stored on a computer readable medium. The computer readable medium is any data storage device that can store data, which can thereafter be read by a computer system. Examples of computer readable medium include for example read-only memory, random-access memory, USB keys, Flash Memory (such as SD cards), CD-ROMs, DVR-ROMS, magnetic tape and optical data storage devices. The computer readable program code can also be distributed over a network including coupled computer systems so that the computer readable program code is stored and executed in a distributed fashion.

Although particular embodiments have been described above, those of skill in the art will appreciate that variations and modifications may be made without departing from the spirit and scope thereof as defined by the appended claims.

What is claimed is:

1. An apparatus for coordinating data sharing in a computer network, comprising:

an interface for connecting to each of at least two physical display devices, each of the physical display devices including a touch surface;

a storage device storing associations between each of at least one unique temporary session connection code (SCC) and a respective at least one of the at least two physical display devices, the storage device also storing a respective future SCC activation date or time;

an interface receiving requests from one or more source computers to establish communications sessions for sharing data, each of the requests including a client SCC; and a processor configured to determine whether a request is valid by verifying that it is received on or after the respective SCC activation date or time, and that the client SCC is stored in the storage device;

choose fewer than all of the at least two physical display devices as at least one designated physical display device based on a stored association between the client SCC and the at least one designated physical display device;

establish a bidirectional communications session between the requesting source computer and the at least one designated physical display device based on the associations stored in the storage device only in the event that the request is determined to be valid; and once the bidirectional communications session is established, transmit touch data received from the at least one designated physical display device to the requesting source computer and transmit video data received from the requesting source computer to the at least one designated physical display device.

2. The apparatus of claim 1, wherein the apparatus is a network appliance.

3. The apparatus of claim 1, wherein the apparatus is a controller for controlling the at least two physical display devices.

4. The apparatus of claim 1, wherein a received SCC is considered to be invalid in the event that there is no association in the storage device between the received SCC and any of the at least two physical display devices.

5. The apparatus of claim 1, wherein the storage device stores at least one condition parameter.

6. The apparatus of claim 5, wherein the at least one condition parameter is an SCC expiry date.

7. The apparatus of claim 5, wherein the at least one condition parameter specifies whether an SCC is considered invalid after its first use for establishing a communications session.

8. The apparatus of claim 5, wherein the at least one condition parameter specifies whether or not a physical display device is permitted to share data with more than one source computer.

9. The apparatus of claim 5, wherein the at least one condition parameter specifies whether a request is to be queued in the event that a communications session with the respective one of the at least two physical display devices associated with the received SCC has already been established with another source computer.

10. The apparatus of claim 5, wherein the at least one condition parameter specifies whether, in the event that a communications session with the respective one of the at least two physical display devices associated with the received SCC has already been established with another source computer, a communications session is to be established with at least one available physical display device with which the received SCC is not associated.

11. The apparatus of claim 5, wherein the at least one condition parameter specifies whether a source computer is permitted to share data with more than one physical display device.

12. The apparatus of claim 5, wherein the at least one condition parameter specifies whether receipt of a single valid SCC from different source computers permits establishing simultaneous sharing of data between multiple source computers and respective physical display devices.

13. The apparatus of claim 1, wherein the storage device stores associations between a single SCC and at least two physical display devices.

14. The apparatus of claim 1, wherein the establishing is based on associations stored in the storage device between the received SCC and one or more physical display devices.

15. The apparatus of claim 1, wherein the establishing comprises: determining the respective one of the at least two physical display devices associated with the received SCC in the storage device thereby to establish the communications session accordingly.

16. The apparatus of claim 1, wherein at least one of the at least two physical display devices is an interactive whiteboard.

17. The apparatus of claim 1, wherein the shared data includes electronic files.

18. The apparatus of claim 1, wherein the at least one SCC is a data sequence of at least one of letters, numbers, symbols, gestures, voice data, and light sequence data.

19. A method for coordinating data sharing in a network with at least two physical display devices, each of the physical display devices including a touch surface, the method comprising:
generating at least one temporary unique session connection code (SCC), the at least one SCC containing an identifier for a respective one of the at least two physical display devices;
forming associations by associating each of the at least one SCC with a respective at least one of the at least two physical display devices and a future SCC activation date or time;
storing at least one SCC and the associations in memory;
receiving requests from one or more source computers to establish a communications session for sharing data, each of the requests including a submitted SCC;
determining whether a request is valid by verifying that it is received on or after the SCC activation date or time, and that the submitted SCC is one of the at least one SCCs stored in memory;
choosing fewer than all of the at least two physical display devices as at least one designated physical display device based on a stored association between the submitted SCC and the at least one designated physical display device;
establishing a bidirectional communications session between the requesting source computer and the at least one designated physical display device based on the associations stored in memory only in the event that a the request is determined to be valid; and
once the bidirectional communications session is established, transmitting touch data received from the at least one designated physical display device to the requesting source computer and transmitting video data received from the requesting source computer to the at least one designated physical display device.

20. The method of claim 19, wherein each SCC has an expiry date.

21. The method of claim 20, wherein each SCC is automatically dissociated from any physical display devices after its expiry date.

22. The method of claim 19, wherein an SCC is deemed invalid after its first successful use to establish a communications session.

23. The method of claim 19, wherein the communications session is established with one physical display device.

24. The method of claim 19, wherein the communications session is established with at least two physical display devices.

25. The method of claim 24, wherein the communications session supports the sharing of data between an application on the source computer and a first of the at least two physical display devices, and another application on the source computer and a second of the at least two physical display devices.

26. The method of claim 19, further comprising storing one or more condition parameters, the one or more condition parameters including: whether the respective one of the at least two physical display devices with which the received SCC is associated is permitted to share data with more than one source computer.

27. The method of claim 19, wherein in the event that the respective one of the at least two physical display devices with which the received SCC is associated is already sharing data with another source computer, refusing the request.

28. The method of claim 19, wherein in the event that the respective one of the at least two physical display devices with which the received SCC is associated is already sharing data with another source computer, instructing the respective one of the at least two physical display devices to also share data with the requesting source computer.

29. The method of claim 19, wherein in the event that the respective one of the at least two physical display devices with which the received SCC is associated is already sharing data with another source computer, queuing the request.

30. The method of claim 29, further comprising re-evaluating the queued request for establishing a new communications session, when the communications session with the other source computer has ended.

31. A method for establishing a communications session for sharing data, comprising:
generating a unique temporary session connection code (SCC) for a respective one of at least two physical display devices in a computer network, each of the physical display devices including a touch surface;
in a storage device, associating the SCC with the respective one of the at least two physical display devices and with a future SCC activation date or time, the SCC containing an identifier of the respective one of the at least two physical display devices;
receiving the SCC at a user interface of a source computer in the network;
transmitting the SCC in a request to establish a communications session for sharing data;
determining whether the request is valid by verifying that the SCC is stored in the storage device;
choosing the respective one of the at least two physical display devices as a designated physical display device based on a stored association between the SCC and the designated physical display device;
using the SCC, establishing a bidirectional communications session for directing video and touch data between the source computer and the designated physical display device via the network, only in the event that the SCC is valid and received at the user interface on or after the SCC activation date or time.

32. The method of claim 31, wherein establishing comprises: establishing a communications session for sharing data via a controller, wherein the controller routes data from the source computer to the respective one of the at least two physical display devices, and vice versa.

33. The method of claim 32, wherein establishing comprises: the source computer broadcasting the SCC in an SCC request on the network; and the controller responding to the broadcasting to initiate the communications session.

34. The method of claim 33, wherein broadcasting and responding is conducted according to the UDP network protocol.

35. The method of claim 32, wherein the SCC comprises a base component and a payload component.

36. The method of claim 35, wherein the payload component comprises data identifying the network address of the controller.

37. The method of claim 36, wherein establishing comprises: the source computer using the network address of the controller to initiate the communications session with the controller.

38. The method of claim 36, wherein the payload component comprises a display device identifier that distinguishes the respective one of the at least two physical display devices from any other devices connected to the controller.

39. The method of claim 38, wherein establishing comprises: the source computer using the network address of the controller to initiate the communications session with the controller; and using the display device identifier to inform the controller that the data is for display by the respective one of the at least two physical display devices.

40. The method of claim 35, wherein the payload component comprises a display device identifier that distinguishes the respective one of the at least two physical display devices from any other devices connected to the controller.

41. The method of claim 40, wherein establishing comprises: broadcasting the SCC by the source computer across the network; responding to the broadcasting by the controller to initiate the communications session; and the display device identifier being used to inform the controller that data being provided is for display by the respective one of the at least two physical display devices.

42. The method of claim 32, wherein the SCC distinguishes the respective one of the at least two physical display devices from any other devices connected to the controller.

43. The method of claim 42, wherein at least one other device connected to the controller is associated with respective unique SCC for establishing a communications session for providing data to the at least one other device via the network.

44. The method of claim 32, wherein the controller generates a unique SCC for each of the at least two physical display devices under control of the controller.

45. The method of claim 31, wherein the communications session is established via at least one additional device in the network.

46. The method of claim 31, wherein the SCC is randomly generated based on predetermined code parameters.

47. The method of claim 46, wherein the predetermined code parameters comprise at least one of code length, ineligible numbers, ineligible letters, and ineligible symbols.

48. The method of claim 31, wherein during the communications session only the source computer is permitted to share data with the respective one of the at least two physical display devices.

49. The method of claim 31, further comprising: storing data from or based on the communication session in association with the SCC for subsequent access using the SCC.

50. The method of claim 31, wherein the SCC becomes unusable for establishing the communications session under predetermined conditions.

51. The method of claim 50, wherein the predetermined conditions comprise at least one of: expiry of a predetermined time limit, and first use of the SCC for establishing a communications session.

52. A system for establishing a communications session for displaying video data, comprising:
at least two physical display devices in a computer network, each of the physical display devices including a touch surface;
a controller comprising a storage device storing a unique temporary session connection code (SCC) in association with a respective one of the at least two physical display devices and a future SCC activation date or time, the SCC containing an identifier for of the respective one of the at least two physical display devices; and
at least one source computer in the network having a user interface for receiving a SCC and in response executing a session establishing procedure with the controller to establish a bidirectional communications session for directing video and touch data between the source computer and the respective one of the at least two physical display devices associated with the received SCC, the session establishing procedure comprising:
transmitting the SCC in a request to establish the bidirectional communications session,
determining whether the request is valid by verifying that the SCC is received on or after the SCC activation date or time, and that the SCC is stored in the storage device,
choosing the respective one of the at least two physical display devices as a designated physical display device based on a stored association in between the SCC and the designated physical display device, and
establishing the bidirectional communications session between the source computer and the designated physical display device only in the event that the request is determined to be valid.

53. The system of claim 52, wherein the controller controls the at least two physical display devices and wherein the storage device stores a table associating each SCC with its respective physical display device.

54. The system of claim 52, wherein the controller comprises a non-transitory computer readable medium embodying a computer program for generating SCCs.

55. A non-transitory computer readable medium embodying a computer program for coordinating data sharing in a network with at least two physical display devices, each of the physical display devices including a touch surface, the computer program comprising program code for:
generating at least one temporary unique session connection code (SCC);
forming associations by associating each of the at least one SCC with a respective one of the at least two physical display devices, the at least one SCC containing an identifier for the respective one of the at least two physical display device;
storing the at least one SCC, the associations, and a respective future SCC activation date or time in memory;
receiving requests from one or more source computers to establish a communications session for sharing data, each of the requests including a submitted SCC;

determining whether a request is valid by verifying that it is received on or after the SCC activation date or time, and that the submitted SCC is one of the at least one SCCs stored in memory;

choosing the respective one of the at least two physical display devices as a designated physical display device based on a stored association between the client SCC and the designated physical display device;

establishing a bidirectional communications session between the requesting source computer and the designated physical display device based on the stored associations only in the event that the request is determined to be valid; and once the bidirectional communications session is established, transmitting touch data received from the designated physical display device to the requesting source computer and transmitting video data received from the requesting source computer to the designated physical display device.

56. A non-transitory computer readable medium embodying a computer program for coordinating data sharing in a network with at least two physical display devices, each of the physical display devices including a touch surface, the computer program comprising program code for:

generating at least one temporary unique session connection code (SCC);

in a storage device, associating each of the at least one SCC with a respective one of the at least two physical display devices and a future SCC activation date or time, the at least one SCC containing an identifier for the respective one of the at least two physical display devices;

receiving requests from one or more source computers to establish a communications session for sharing data, each request comprising an SCC;

determining whether a request is valid by verifying that the SCC in the request is stored in the storage device;

choosing the respective one of the at least two physical display devices as a designated physical display device based on a stored association between the SCC and the designated physical display device;

in response to the request, establishing a bidirectional communications session for directing video and touch data between the requesting source computer and the designated physical display device only in the event that a valid SCC is received in connection with the request, and the request is received on or after the SCC activation date or time, and further wherein the establishing is based on the received SCC.

* * * * *